United States Patent [19]

Taylor

[11] Patent Number: 4,596,377
[45] Date of Patent: Jun. 24, 1986

[54] RESTRICTOR VALVE OPERATOR

[76] Inventor: Julian S. Taylor, 8300 SW. 8, Oklahoma City, Okla. 73128

[21] Appl. No.: 642,472

[22] Filed: Aug. 20, 1984

[51] Int. Cl.⁴ .............................................. F16K 31/44
[52] U.S. Cl. .................................. 251/248; 251/294; 251/304; 74/96
[58] Field of Search .................. 251/304, 248, 294; 74/89.2, 96, 89.22

[56] References Cited

U.S. PATENT DOCUMENTS

| | | | |
|---|---|---|---|
| 384,849 | 6/1888 | Hood | 251/164 |
| 1,715,642 | 6/1929 | Daniels | 251/294 X |
| 2,954,703 | 10/1960 | Morrell | 74/422 |
| 3,026,899 | 3/1962 | Michanski | 137/375 |
| 3,932,045 | 1/1976 | Hillberry et al. | 403/121 |
| 4,351,197 | 9/1982 | Carson | 74/89.22 |
| 4,366,722 | 1/1983 | Hasler | 74/99 R |
| 4,507,979 | 4/1985 | Zebrowski | 74/89.22 |

FOREIGN PATENT DOCUMENTS

| | | | |
|---|---|---|---|
| 2431881 | 1/1976 | Fed. Rep. of Germany | 74/89.2 |
| 2509002 | 1/1983 | France | 74/96 |

*Primary Examiner*—Samuel Scott
*Assistant Examiner*—Allen J. Flanigan
*Attorney, Agent, or Firm*—Robert K. Rhea

[57] ABSTRACT

A remote control operator for a fluid flow restrictor valve having a flow passageway opened and closed by an angularly rotatable disc moving ports into and out of alignment with companion ports. The valve operator comprises tangentially disposed part-circular plates with one plate secured to the restrictor valve rotatable disc and the other plate angularly rotated by a reversible drive motor. A flexible strand, secured at its ends to diametrically opposite portions of one plate, is tautly entrained intermediate its ends around portions of both plates in cooperating grooves formed in the arcuate peripheries thereof. Energizing the motor in respective directions angularly rotates the plates for opening and closing the valve flow passageway.

7 Claims, 6 Drawing Figures

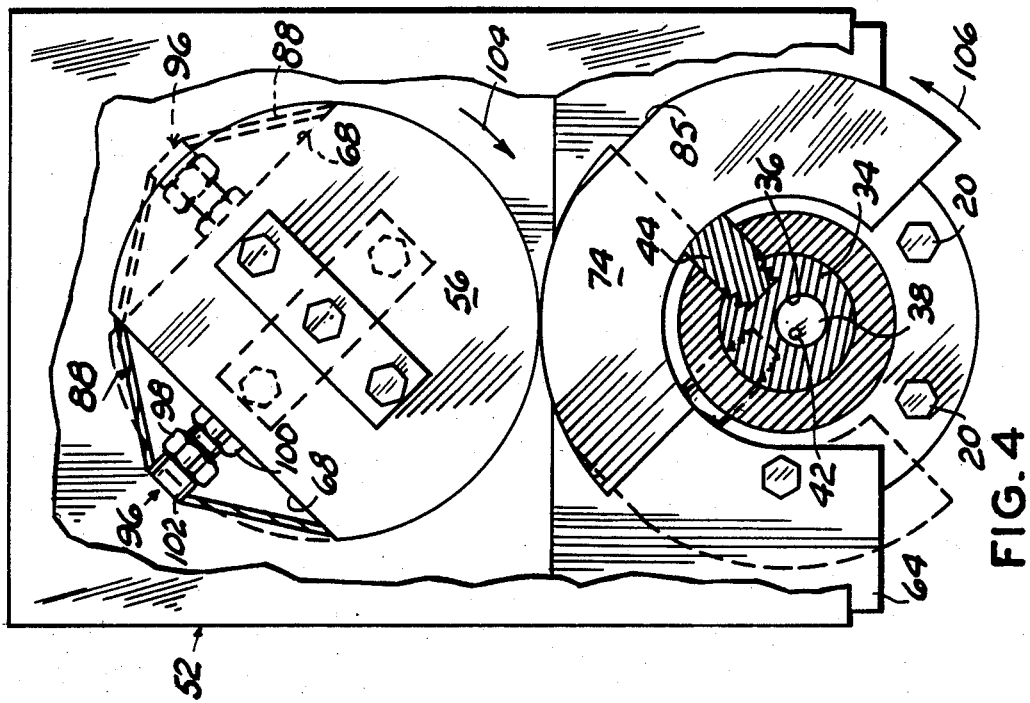
FIG. 4
FIG. 6
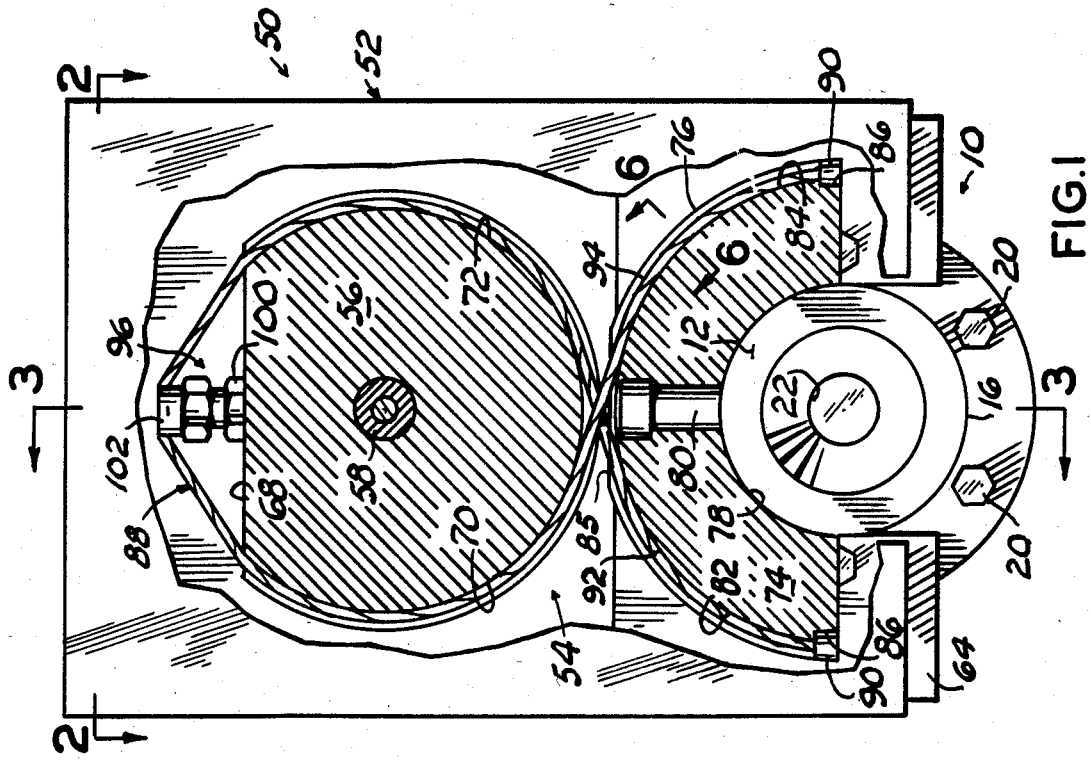
FIG. 1

RESTRICTOR VALVE OPERATOR

BACKGROUND OF THE INVENTION

1. Field of the Invention

The present invention relates to flow restrictor valve operators and more particularly to an operating control for opening and closing the flow passageway through a restrictor valve.

2. Description of the Prior Art

Flow restrictor valves are usually provided with a pair or several discs intersecting its flow passageway. The discs usually have graduated slots or apertures mating and mismating to open and close the valve fluid passageway. One of the discs is angularly rotated relative to the other to permit a predetermined quantity of fluid to flow through the valve. The restrictor valve restrictive apertures are opened to full flow from a closed position by substantially 90° angular rotation of one of the flow passageway intersecting discs. Heretofore remote controls for such restrictor valves have usually comprised a series of pivotally interconnected links operated by a prime mover for angular rotation of a portion of the valve containing one of the flow restrictor discs. A repeatable predetermined angle of rotation of a flow passageway opening disc is difficult to achieve by mechanical linkage controls or levers due in part to the necessary tolerance of connected components. Furthermore, full torque of the driving motor when operating linkage to move the valve opening components of a restrictor valve through an arc of 90° cannot easily be utilized resulting in approximately only 70% of the driving motor torque being applied to the linkage due to the arc through which the connected lever must move. This reduced torque usually being applied to the valve in an effort to open the valve passageway from a closed position which ordinarily requires the greater torque.

This invention is distinctive over the pivoting lever type operators for controlling the setting of a restrictive valve by providing a pair of cooperating part-circular plates operatively connected with a restrictor valve and a driving motor which opens and closes the valve by a flexible strand entrained around cooperating arcs of the plates.

SUMMARY OF THE INVENTION

In a restrictor valve having a housing with a flow passageway therethrough transversely intersected by a pair of juxtaposed discs with one disc being fixed to the valve body and the other disc being angularly rotated, for mating and mismating cooperating ports through the discs, by a lever secured to a rotatable axial insert in the valve housing mounting the rotatable disc and projecting outwardly through a slot in the valve housing. A substantially semicircular flat ring segment transversely overlies the restrictor valve body and is secured to the restrictor valve disc operating lever. The outer periphery of the ring segment is provided with parallel grooves.

A gear train equipped driving motor is mounted on an upright panel supported by the valve housing with the drive shaft of the gear train horizontally projecting through the panel above the peripheral arc of the ring segment.

A substantially circular plate is axially connected with the gear train drive shaft in tangential relation with respect to the ring segment. The periphery of the plate is similarly provided with parallel grooves and an arcuate section of the plate opposite the ring segment is cut off along a cord line. A flexible member, such as a length of cable is secured at its respective ends to the respective end of the ring segment in opposite ones of the pair of grooves. The cable extends intermediate its ends along the respective groove and arc of the ring segment in crossed relation between the plate and ring segment and is nested by the respective groove of the plate aligned with the grooves in the ring segment with the cross-over of the cable from one plate groove to the other plate groove occurring medially the cable length and the chord defining the subtended arc of the plate. Angular forward or reverse rotation of the gear train drive shaft moving the plate through an arc of substantially 90° opens or closes the restrictor valve flow passageway.

The principal object of this invention is to provide a remote control for operating a restrictor valve requiring less than a full revolution of its actuator for a valve open to a closed position by utilizing the full torque of a drive motor on the valve components at any position of the restrictor valve and precluding lost motion of valve control components by eliminating loose fitting parts thus permitting repeatable predetermined incremental settings of fluid passageway apertures.

BRIEF DESCRIPTION OF THE DRAWINGS

FIG. 1 is a front elevational view of the device operatively mounted on a restrictor valve with parts broken away and sectioned for clarity;

FIG. 4 is a view similar to FIG. 1 illustrating by solid and dotted lines the full opened and closed position of the components operating the restrictor valve;

FIG. 6 is a fragmentary cross sectional view, to a larger scale, taken substantially along the line 6—6 of FIG. 1.

DESCRIPTION OF THE PREFERRED EMBODIMENTS

Figure 5:
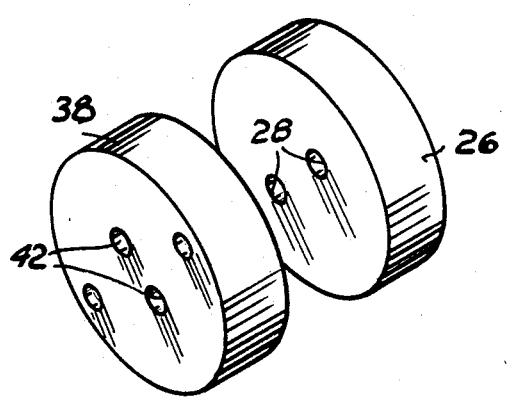
FIG. 5 is a perspective view of the restrictor flow control discs, per se.

Like characters of reference designate like parts in those figures of the drawings in which they occur.

Figure 3:
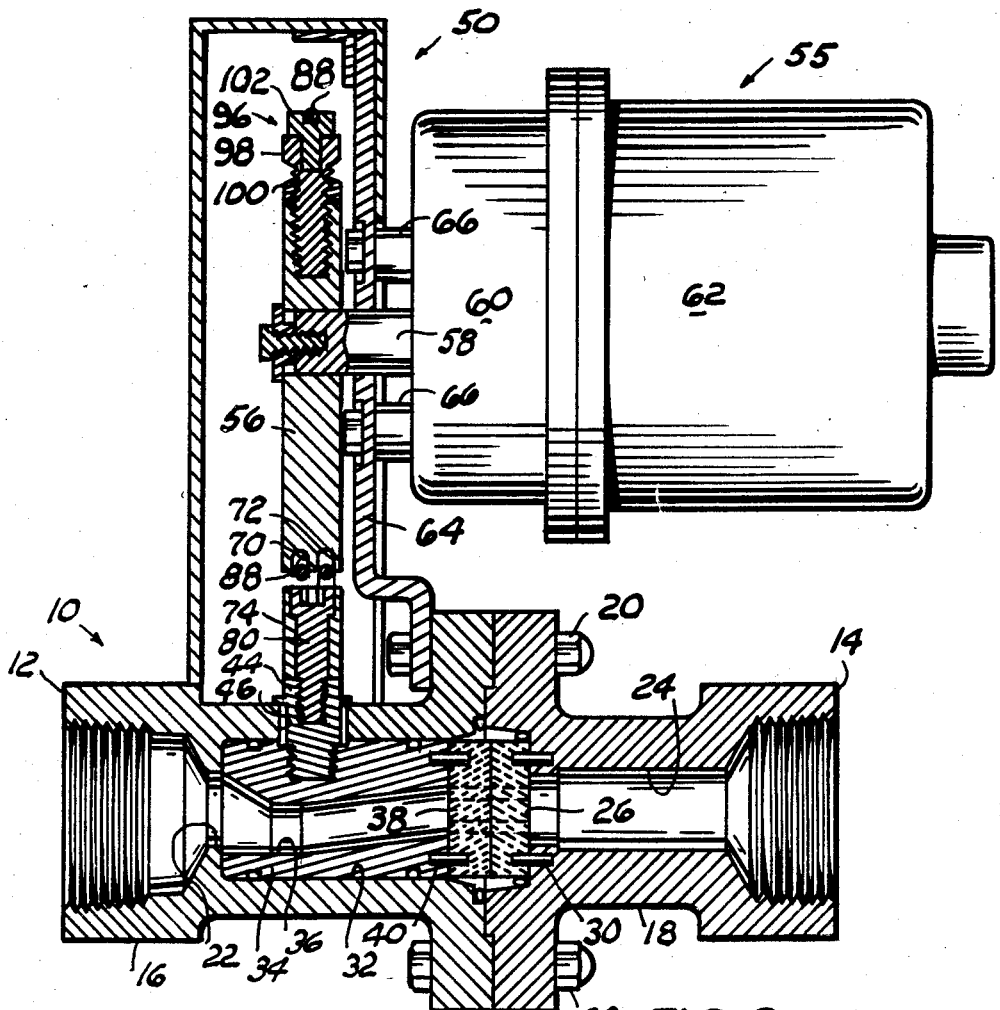

In the drawings:

Referring first to FIGS. 3 and 5, the reference numeral 10 indicates a generally cylindrical restrictor valve adapted to be interposed at its respective ends 12 and 14 in a flow line, not shown. The valve 10 comprises a housing divided intermediate its ends to form an upstream end portion 16 and a downstream portion 18 axially secured together by bolts 20. Each of the housing sections is provided with cooperating bores 22 and 24 forming a flow passageway through the valve. The upstream end portion of the valve housing section 18 receives a flow restrictor bushing 26 having centrally disposed spaced-apart apertures 28 extending therethrough. The bushing 26 is anchored to the housing section 18 by a plurality of pins 30 to prevent angular rotation of the bushing relative to the valve section 18 for the reasons presently apparent.

The upstream housing section 16 has a counterbore 32 in its downstream end angularly rotatably receiving a valve housing insert 34, cylindrical in general configuration, and provided with a bore 36 forming an upstream portion of the valve flow passageway. An upstream bushing 38, substantially identically formed with respect to the downstream bushing 26, is disposed in flat face to face contact with the downstream bushing 26 and is similarly anchored to the valve housing insert 34 by a plurality of other pins 40 so that the bushing 38 is angularly rotated with the valve housing insert 34 as presently explained.

The bushing 38 is centrally provided with a pair of spaced apertures 42 which move into and out of mating and mismating relation with the downstream bushing apertures 28 as the bushing 38 is angularly rotated for interrupting, restricting or providing fluid flow through the bushings. Angular rotation of the valve housing insert 34 and its connected bushing 38 is achieved by a lever 44 radially secured to the housing insert 34 and projecting outwardly of the upstream housing section 16 through a slot 46 formed in the valve housing wall. The slot 46 extends transversely of the insert bore 36 through an arc preferably of at least 90°.

The above description forms no part of the invention other than to set forth an operable preferred type fluid flow restrictor valve which may be controlled by the invention as described hereinbelow.

Referring also to the remaining Figures, the reference numeral 50 indicates the valve operator as a unit, which is upright rectangular in general configuration comprising a control housing or shield 52 surrounding restrictor valve drive means 54 supported by the restrictor valve housing and driven by a motor means 55 for adjusting fluid flow through the valve 10.

Figure 2:
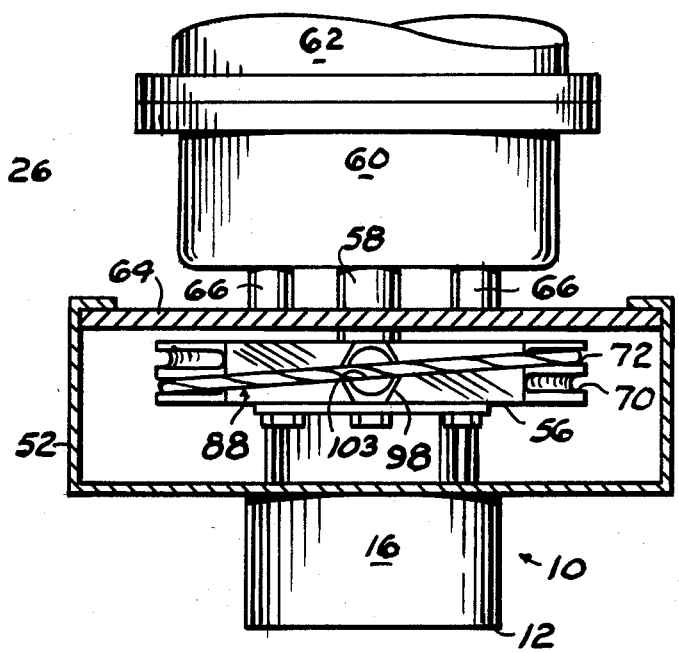
FIGS. 2 and 3 are horizontal and vertical cross sectional views respectively taken substantially along the lines 2—2 and 3—3 of FIG. 1.

A first part circular drive plate 56 of selected thickness, disposed in a plane normal to the axis of the valve flow passageway, is centrally secured to the drive shaft 58 of a gear train 60 driven by a reversible motor 62 connected with a source of electrical energy, not shown. The motor and gear train are secured as a unit to an upright panel 64, supported by the restrictor valve housing bolts 20 parallel with the plane of the drive plate 56 by lugs and nuts 66. As viewed in FIG. 1, an arc of the circumference of the plate 56 is subtended by a chord indicated by the line 68 and removed or omitted for the purpose presently explained. The remaining arcuate perimeter or circumferential surface of the plate 56 is provided with a pair of juxtaposed flexible strand receiving grooves 70 and 72 (FIG. 2).

A second slave or driven ring segment plate 74 is interposed between the drive plate 56 and the restrictor valve 10 in the plane of the plate 56. In the example shown, the driven plate 74 is substantially a semicircular ring or washer-like segment, of equal thickness with respect to the drive plate 56, having an arcuate semicircular circumferential edge 76 and an inner semicircular edge 78 loosely surrounding an arc of substantially 180° of the housing forward section 16. The driven plate 74 is radially apertured medially its ends for receiving a bolt 80 connecting it to the restrictor valve operating lever 44 by threaded engagement therewith. Similarly, the semicircular edge 76 of the driven plate 74 is provided with a pair of juxtaposed grooves 82 and 84 cooperatively aligned with the drive plate grooves 70 and 72. A lug receiving socket 86 of greater transverse dimension than the width and depth of the grooves is formed in the end surfaces of the driven plate 74 at the ends of the respective groove 82 and 84 for the purposes presently explained.

An elongated flexible member or strand, such as a cable 88 of selected length and a diameter freely received by each of the grooves, is provided with a lug 90 at its respective end cooperatively received by the selected groove end sockets 86 for anchoring the ends of the cable therein. Respective end portions 92 and 94 of the cable are entrained in the drive plate grooves 82 and 84 with these end portions crossing at the plate tangent position with a respective half of the remaining intermediate portion of the cable extending in wrap-around fashion through a respective portion of the drive plate grooves 70 and 72 aligned with the driven plate grooves 82 and 84. The cross-over of the cable from the groove 70 to the groove 72 or vice versa occurring in the subtended top area of the drive plate 56 (FIG. 2).

A segment of the periphery of the driven plate 74 is similarly cut off a depth equal to the depth of the grooves 82 and 84 at the tangent position of the plates, as viewed in FIG. 1 and indicated by the chord 85, for the purpose of replacing the cable 88, when worn, without disassembling the drive or driven plate components.

Cable tension adjustment means 96 is interposed between the medial portion of the cable 88 and chord surface 68. The cable tension means 96 comprises a bolt 98 threadedly engaged in a radial socket in the drive plate 56 and locked by a lock nut 100. A bushing 102, provided with a cable receiving slot 103 at one end, is angularly rotatably journalled by its other end portion in an axial socket formed in the outer end portion of the bolt 98. Thus angular rotation of the bolt 98, in an unscrewing direction with respect to its connection with the plate 56, draws the respective ends of the cable into tight engagement with the respective groove socket 86 and tautly entrains it in the nesting groove so that no looseness or angular rotation of either plate 56 or 74 is possible without angular rotation of the other plate due to the tension on the cable 88 and its wrap-around type frictional engagement with the major arcuate surface portion of each of the plates 56 and 74.

The shield 52 is downwardly open box-like in general configuration and is disposed in overlying relation with respect to the plates 56 and 74 and is supported by its inner closed end surface contacting the upper limit of the support panel 64. The major portion of the rearward wall of the shield being open to accommodate the mounting of the gear motor means and in which the panel 64 effectively forms a rearward weather tight closure for the shield.

Operation

In operation, assuming the control unit 50 has been mounted on a restrictor valve 10, as described hereinabove and the plates 56 and 74 are in the solid line position of FIG. 4 so that the disc apertures 28 and 42 are disposed in mated position for full volume fluid flow through the valve 10. Energizing the motor 62 for angular rotation of its armature in one direction for operating the gear train 60 angularly rotates the drive plate 56 in a clockwise direction, indicated by the arrow 104, and simultaneously angularly rotates the driven plate 74 substantially 90° in a counterclockwise direction, as indicated by the arrow 106, thus angularly rotating the disc 38 to a flow passageway closed position by the mismated apertures 28 and 42.

In the event a predetermined volume or a reduction in fluid flow is desired, the motor 62 is energized for angularly rotating the disc 38 relative to the disc 26 for partial mismating of the apertures 28 and 42 to achieve the desired volume of fluid flow through the valve 10, as indicated by a flow meter, not shown.

Obviously the invention is susceptible to changes or alterations without defeating its practicability. Therefore, I do not wish to be confined to the preferred embodiment shown in the drawings and described herein.

I claim:

1. In a restrictor valve having a variable volume axial flow passageway through a valve housing including an angularly rotatable member opening and closing the passageway by a lever projecting laterally of the housing and moveable to and fro through a predetermined arc transversely of the flow passageway, the improvement comprising:
   a drive part-circular plate and a driven ring segment plate supported by said valve in a common plane extending transversely of the flow passageway and having a portion of their circular peripheries tangentially disposed,
       the inner peripheral edge of said driven plate being rigidly connected radially with said lever in straddling relation with respect to the valve housing;
   a flexible strand secured at its respective ends in diametric opposition to said driven plate and entrained intermediate its ends in opposing directions around the circular peripheries of said drive and driven plates; and,
   reversible driving means operatively connected with said drive plate for angularly rotating said drive plate in opposing directions and simultaneously angularly rotating said driven plate in a respective opposite direction.

2. The combination according to claim 1 in which the drive plate is characterized by a chord, located medially along the length of the flexible strand, subtending an arc of the drive plate and further including: tension means radially interposed between the chord on said drive plate and the flexible strand for maintaining said strand taut.

3. The combination according to claim 2 and further including:
   a panel supported in lateral extending relation by said valve housing and in which said driving means includes motor means supported by said panel.

4. The combination according to claim 2 and further including:
   an outstanding panel laterally supported by said valve housing;
   a gear train supported by said panel,
       said gear train having a drive shaft drivably connected with said drive plate; and,
   a motor driving said gear train.

5. The combination according to claim 4 in which the circular peripheries of said drive plate and said driven plate are respectively provided with parallel grooves respectively aligned with the grooves in the opposite plate for receiving intermediate portions of said strand.

6. The combination according to claim 1 in which the circular peripheries of said drive plate and said driven plate are respectively provided with parallel grooves respectively aligned with the grooves in the opposite plate for receiving intermediate portions of said strand.

7. The combination according to claim 2 in which the circular peripheries of said drive plate and said driven plate are respectively provided with parallel grooves respectively aligned with the grooves in the opposite plate for receiving intermediate portions of said strand.

* * * * *